E. H. ASHCROFT.
Steam Gage.
No. 67,096.
Patented July 23, 1867.
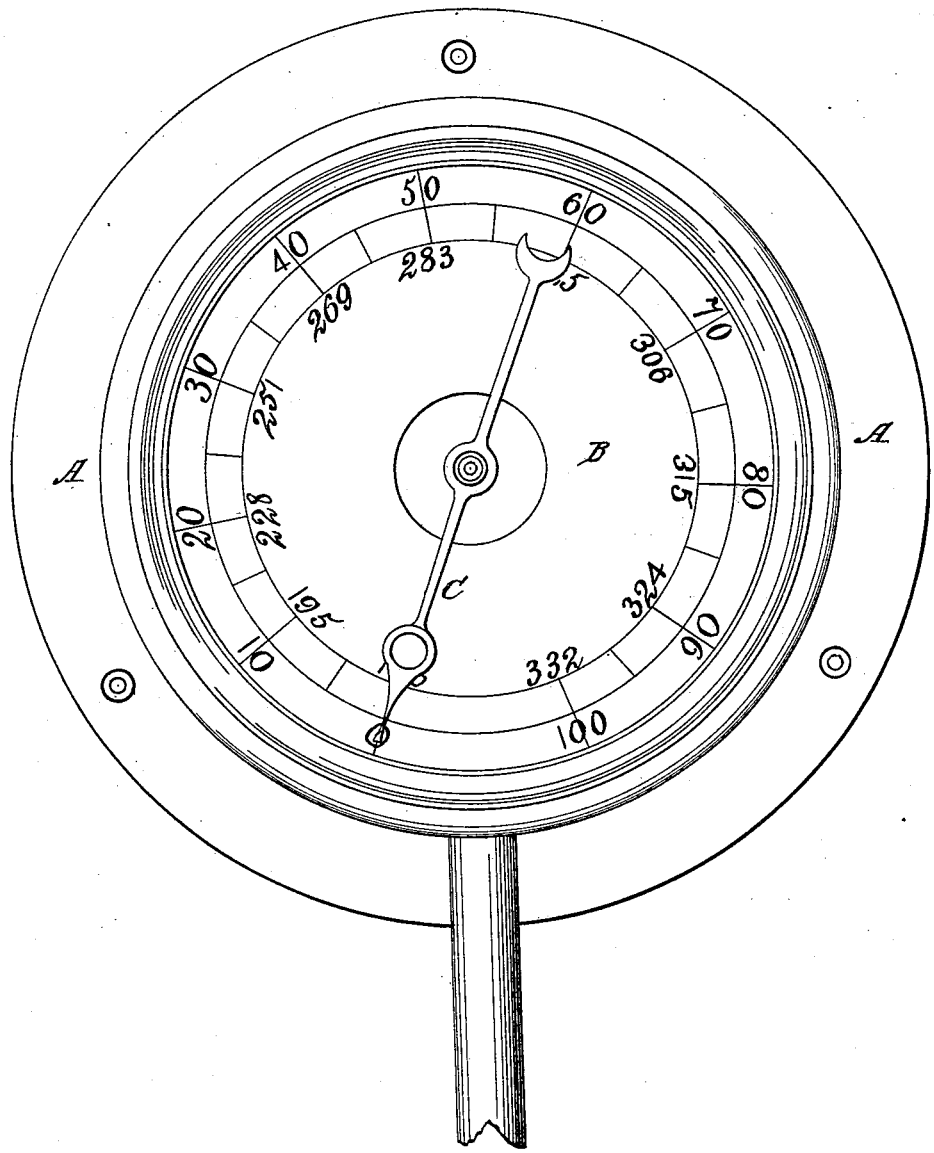

United States Patent Office.

E. H. ASHCROFT, OF LYNN, MASSACHUSETTS.

Letters Patent No. 67,096, dated July 23, 1867.

IMPROVEMENT IN STEAM-GAUGE DIALS.

*The Schedule referred to in these Letters Patent and making part of the same.*

TO ALL WHOM IT MAY CONCERN:

Be it known that I, E. H. ASHCROFT, of the city of Lynn, in the county of Essex, in the State of Massachusetts, have invented a new and useful Improvement in Dials for Steam-Gauges, &c.; and I do hereby declare that the following is a full and exact description thereof, reference being had to the accompanying drawings, and to the letters of reference marked thereon.

The nature of my invention consists in the construction of the dial of a steam-pressure gauge which has an addition of a second series of figures, whereby the same pointer will show at the same time not only the pressure but the temperature of the steam.

To enable others skilled in the art to make and use my invention, I will proceed to describe its construction and operation.

The drawing shows an elevation of an ordinary steam-pressure gauge with my improvement added.

A represents the gauge; B the dial; C the pointer. The outside figures indicate the pressure, and the inside the corresponding temperature of the steam in the boiler due to the pressure. My dial, therefore, is a double indicator.

Having thus described my invention, what I claim as new, and desire to secure by Letters Patent of the United States, is—

In combination with a steam-gauge, A, the graduated dial B, as shown and described, whereby the temperature corresponding to any pressure is indicated at the same time by the pointer.

E. H. ASHCROFT.

Witnesses:
CHARLES E. ASHCROFT,
EDWIN J. WRIGHT.